UNITED STATES PATENT OFFICE.

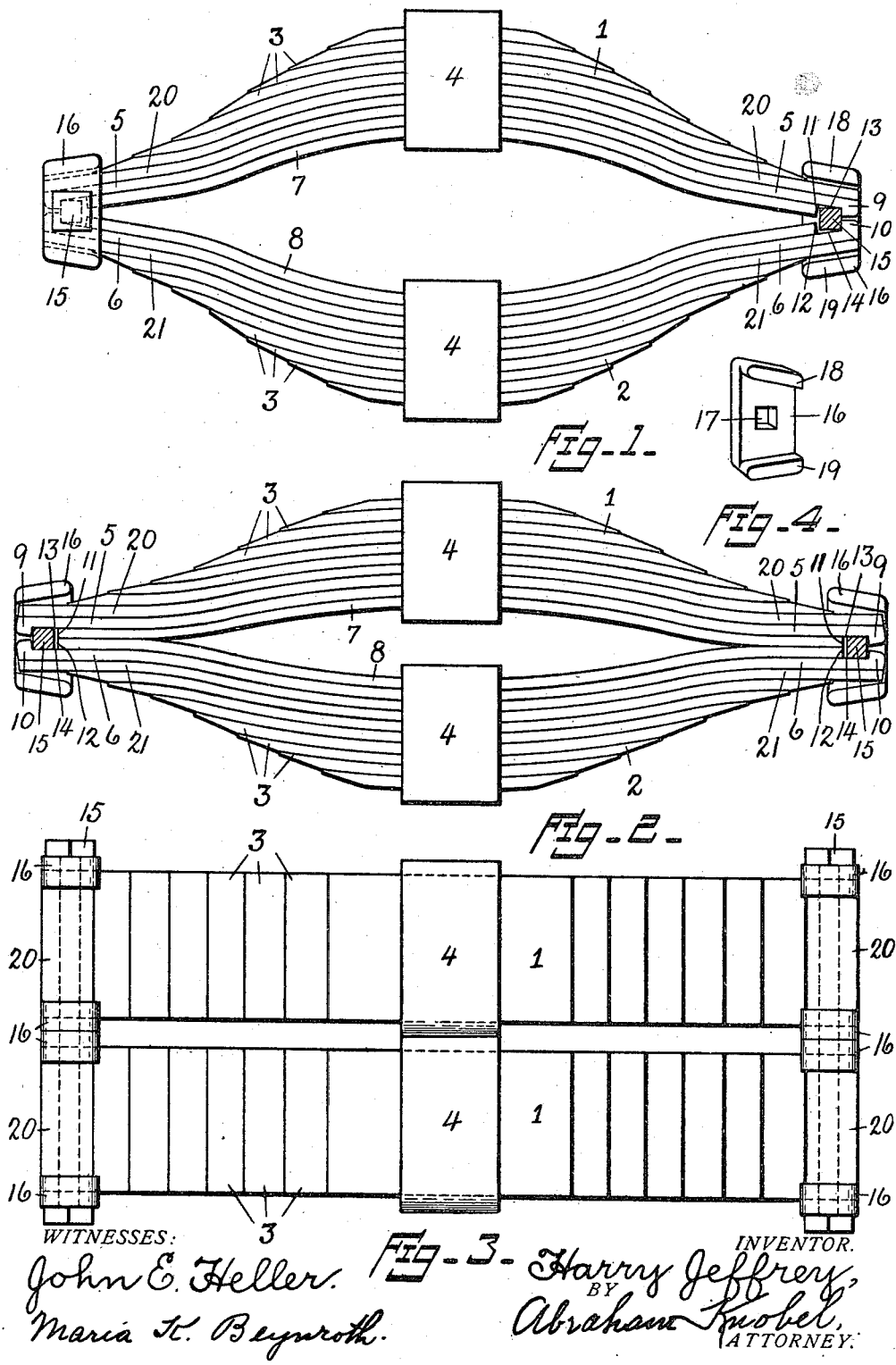

HARRY JEFFREY, OF LOUISVILLE, KENTUCKY.

ELLIPTIC SPRING.

965,191.  Specification of Letters Patent.  Patented July 26, 1910.

Application filed April 11, 1910. Serial No. 554,613.

*To all whom it may concern:*

Be it known that I, HARRY JEFFREY, a citizen of the United States, residing at Louisville, in the county of Jefferson and State of Kentucky, have invented a new and useful Improvement in Elliptic Springs, of which the following is a specification.

This invention relates to elliptic springs, especially such as are used on the trucks of locomotive tenders and railway cars, and some of the objects of my improvement are, simplicity and consequent comparative inexpensiveness of construction and manufacture, durability, comparative inexpensiveness of maintenance, to prevent breaking the ends off the fundamental leaves, to prevent excessive endwise shifting of the two halves relative to each other, to provide a rolling bearing contact between the parts which work together, to strengthen and stiffen the spring as the load is increased by a rolling contact between the secondary fundamental spring-plates, interchangeability of parts, and facility of making repairs. These objects I attain by means of the structure illustrated in the accompanying drawings, in which—

Figure 1 is a side elevation; Fig. 2, a side elevation under compression; Fig. 3 is a top plan view; and, Fig. 4 is a detail perspective view of the flanged washer.

Similar reference numbers refer to similar parts throughout the several views of the drawings.

My invention may be embodied in a full elliptic spring, comprising upper and lower halves or sections, 1 and 2, which are made up of a number of spring-plates, 3, and may be bound together at the middle by straps, 4, in the usual way.

The essential features of the improvement are embodied in the ends of the spring, where the sections 1 and 2 work against each other.

A primary fundamental spring-plate, 5 and 6, is provided in each section of the spring, and a secondary fundamental plate, 7 and 8, respectively, is laid within and against plates 5 and 6.

The plates 5 and 6 extend the entire length of the spring and are formed with angular ends, 9 and 10, these angular ends being preferably formed by upsetting the metal.

The plates 7 and 8 are shorter than plates 5 and 6 and are formed with square ends, 11 and 12, the metal being simply cut off square, and are formed sufficiently shorter than plates 5 and 6 to leave a suitable space between their ends and the inner faces of the angular ends 9 and 10 of plates 5 and 6. It will be understood that by this construction notches, 13 and 14, are provided in the mutually facing surfaces of the sections 1 and 2.

A bolt, 15, preferably of polygonal cross section is placed in these notches, so that the primary fundamental plates 5 and 6 bear upon the upper and lower surface of the bolt and they are kept slightly separated. By reference to Fig. 2, it will be seen that when the spring is set under load the mutually facing surfaces of plates 5 and 6 bear upon bolt 15 along its entire upper and lower surfaces.

The inner faces of the angular ends 9 and 10 are adapted to engage the outer surface of bolt 15, and the end faces of the square ends 11 and 12 are adapted to abut against the inner face of the bolt. Thus, it will be understood, in case of endwise movement of the sections 1 and 2 relative to each other, on account of lunging of the tender or car movement to the right, for example, of the section 1 relative to section 2 will be resisted by end 11 engaging bolt 15 and the bolt in turn engaging the angular end 10 of section 2. This locking of the sections together is accomplished without incidental friction between the sections themselves or between the sections and the bolt and there is therefore neither appreciable loss of resiliency due to friction or appreciable wear from the same cause.

It will be observed that the angular ends 9 and 10 are perfectly free to move while the plates 5 and 6 are in motion, since they are not confined in any way and therefore are not liable to be broken off.

When the spring is placed under load the contiguous surfaces of plates 7 and 8 are caused to approach at their ends 11 and 12, and, if sufficient load is applied, to come into contact and bear upon each other. This produces an effect similar to that of an additional elliptic spring, to help take care of the additional load applied, and considerably strengthens the spring. It will be understood by reference to Fig. 2 that, as additional load is applied, the area of contact between plates 7 and 8 is lengthened and approaches the middle of the spring, so that the spring is accordingly further shortened in effect and strengthened in proportion to the load applied. The attainment of this result is aided to a great extent by forming the plates 7 and 8, as well as the primary fundamental plates 5 and 6, with an ogee curve. It will also be observed that plates 7 and 8 at all times lie in firm contact with plates 5 and 6, at their ends 11 and 12 as well as at the middle under the straps 4, and therefore when plates 7 and 8 bear upon each other the ends of plates 5 and 6 which bear upon bolt 15 are relieved of further strain and therefore not liable to be broken. The secondary fundamental plates 7 and 8, therefore, act as safety plates to the primary fundamental plates 5 and 6 in addition to serving as an additional spring.

To keep the sections 1 and 2 in vertical alinement and prevent them from jumping apart, washers, 16, are provided. These are formed with a polygonal hole, 17 adapting them to receive bolt 15, and an upper and lower flange, 18 and 19. The washers 16 are so placed as to bear against the edges of plates 5, 6, 7, 8 and their flanges 18 and 19 extend over the upper surface of plates 9 and 10, or additional plates, 20 and 21, when the spring is provided therewith.

The flanges 18 and 19 are so spaced that they do not come into contact with the spring plates when the spring is in operation, but allow freedom of motion to the plates.

It will be understood that the washers 16 are supported out of contact with the upper and lower surfaces of the spring plates by bolt 15, which fits snugly in the hole 17, and thus rattling between the plates and the washers is avoided without incurring the danger of binding the plates in the washers and possibly breaking off their ends.

It will be appreciated that by the features just described a thoroughly resilient and durable spring is provided and one which may be easily and cheaply constructed and easily repaired and maintained in operative condition.

Having thus described my invention, so that any one skilled in the art pertaining thereto may understand its construction and use, I claim—

1. An elliptic spring, comprising in combination, a primary fundamental plate formed with bent angular ends, and a secondary fundamental plate placed against said primary fundamental plate and formed with straight square ends and shorter than said primary fundamental plate so that its ends lie at some distance within the angular ends of said primary fundamental plate.

2. An elliptic spring, comprising in combination, a primary fundamental plate formed with angular ends, a secondary fundamental plate lying within and against said primary fundamental plate formed with square ends and shorter than said primary fundamental plate, and a bolt of polygonal cross section placed under said primary fundamental plate to support it and between the angular end of said primary fundamental plate and the square end of said secondary fundamental plate to receive the end thrust of said plates.

3. In an elliptic spring, a primary fundamental plate, a secondary fundamental plate, a polygonal bolt placed between the ends of said plates, and a flanged washer on said bolt and against the edges of said plates so that the flange of said washer may engage said primary fundamental plate and prevent it from leaving said bolt.

4. An elliptic spring, comprising in combination, a pair of primary fundamental plates formed with bent angular ends and an ogee curve near each end, and a pair of secondary fundamental plates lying within and against said primary fundamental plates and formed with straight square ends and an ogee curve corresponding to the ogee curve of said primary fundamental plates and being separated an appreciable distance from each other at the beginning of compression but adapted to bear upon each other when the spring has been considerably set under load.

5. A full elliptic spring, comprising corresponding upper and lower primary fundamental plates formed with angular ends and ogee curves, upper and lower secondary fundamental plates formed with square ends and ogee curves adjacent their ends placed contiguous to each other and adapted to bear upon each other when the spring is set under load, a bolt of polygonal cross section placed between the mutually facing sides of said primary fundamental plates and between the angular ends of said primary fundamental plates and the square ends of said secondary fundamental plates, and flanged washers secured on said bolts against the edges of said plates the flanges of which engage and prevent said plates from separating and leaving said bolts.

HARRY JEFFREY.

Witnesses:
ABRAHAM KNOBEL,
E. R. GAMBRELL.